United States Patent
Ubeda et al.

(10) Patent No.: US 12,028,738 B2
(45) Date of Patent: Jul. 2, 2024

(54) CONFIGURATION OF HIGH ALTITUDE PLATFORM-BASED CELLULAR RADIO ACCESS NETWORK

(71) Applicant: Vodafone IP Licensing Limited, Newbury (GB)

(72) Inventors: Carlos Ubeda, Newbury (GB); Maria Isabel De La Rosa, Newbury (GB); Fransico Javier Dominguez, Newbury (GB)

(73) Assignee: Vodafone IP Licensing Limited (GB)

( * ) Notice: Subject to any disclaimer, the term of this patent is extended or adjusted under 35 U.S.C. 154(b) by 10 days.

(21) Appl. No.: 16/991,743

(22) Filed: Aug. 12, 2020

(65) Prior Publication Data
US 2021/0058816 A1 Feb. 25, 2021

(30) Foreign Application Priority Data
Aug. 19, 2019 (EP) .................................. 19382715

(51) Int. Cl.
| | | |
|---|---|---|
| H04W 28/02 | (2009.01) | |
| H04B 7/185 | (2006.01) | |
| H04W 52/38 | (2009.01) | |
| H04W 72/04 | (2023.01) | |

(52) U.S. Cl.
CPC .... *H04W 28/0252* (2013.01); *H04B 7/18513* (2013.01); *H04W 52/38* (2013.01); *H04W 72/04* (2013.01)

(58) Field of Classification Search
CPC . H04W 28/0252; H04W 52/38; H04W 72/04; H04B 7/18513
See application file for complete search history.

(56) References Cited

U.S. PATENT DOCUMENTS

| | | | |
|---|---|---|---|
| 7,680,211 B1 * | 3/2010 | von der Embse | ............................ H04L 25/03159 375/299 |
| 8,401,467 B2 | 3/2013 | Miller et al. | |
| 8,929,882 B2 * | 1/2015 | Srinivasan | ........ H04W 36/0088 455/422.1 |
| 9,913,278 B2 | 3/2018 | Heninwolf et al. | |
| 10,009,085 B2 * | 6/2018 | Da Silva | ............... H04B 7/0617 |
| 10,057,916 B2 * | 8/2018 | Barabell | ............. H04W 84/047 |
| 2004/0092257 A1 | 5/2004 | Chung et al. | |
| 2011/0044237 A1 * | 2/2011 | Oh | ........................ H04B 7/2041 455/12.1 |

(Continued)

OTHER PUBLICATIONS

European Search Report for EP19382715.1 dated Dec. 13, 2019.

*Primary Examiner* — Bailor C Hsu
(74) *Attorney, Agent, or Firm* — Workman Nydegger (57) ABSTRACT

A cellular radio access network is provided by a high altitude platform (HAP). The HAP has an antenna system defining a plurality of beams, such that the beams provide separate geographical coverage areas. The radio access network comprises a plurality of cells, each cell being associated with at least one of the plurality of beams. For each of the plurality of cells and/or each of the plurality of beams, a respective load is identified. A configuration is set, based on the loads for the plurality of cells and/or the loads for the plurality of beams, for one or more of: a total number of the plurality of cells; the associations between the plurality of cells and the plurality of beams; and a bandwidth and/or a power for each of the plurality of cells.

16 Claims, 6 Drawing Sheets

(56) References Cited

U.S. PATENT DOCUMENTS

| | | | |
|---|---|---|---|
| 2011/0212681 A1* | 9/2011 | Yamamoto | H04B 7/2041 |
| | | | 455/3.01 |
| 2013/0154880 A1* | 6/2013 | Dickman | G01S 19/36 |
| | | | 342/357.59 |
| 2013/0244570 A1 | 9/2013 | Park | |
| 2013/0260744 A1* | 10/2013 | Xu | H04W 88/02 |
| | | | 455/423 |
| 2015/0236413 A1* | 8/2015 | Turpin | H01Q 3/34 |
| | | | 342/368 |
| 2015/0282003 A1* | 10/2015 | Noerpel | H04W 72/0486 |
| | | | 370/236 |
| 2016/0037434 A1* | 2/2016 | Gopal | H04B 7/1851 |
| | | | 370/316 |
| 2016/0095109 A1* | 3/2016 | Scott | H04B 7/18539 |
| | | | 370/229 |
| 2016/0278064 A1* | 9/2016 | Marsh | H04B 7/185 |
| 2017/0019882 A1* | 1/2017 | Nimbalker | H04W 72/042 |
| 2017/0251379 A1 | 8/2017 | Jong et al. | |
| 2017/0290012 A1* | 10/2017 | Hreha | H01Q 21/24 |
| 2017/0302368 A1* | 10/2017 | Trott | H04B 7/18502 |
| 2017/0353960 A1 | 12/2017 | Heninwolf et al. | |
| 2018/0084476 A1* | 3/2018 | Kay | H04B 7/195 |
| 2019/0090147 A1* | 3/2019 | Durvasula | H04W 72/046 |
| 2019/0115975 A1* | 4/2019 | Freedman | H01Q 15/16 |
| 2019/0379432 A1* | 12/2019 | Monir Vaghefi | H04B 7/18515 |
| 2020/0092901 A1* | 3/2020 | Barabell | H04W 72/1263 |
| 2020/0351892 A1* | 11/2020 | Yi | H04L 5/0092 |
| 2021/0089637 A1* | 3/2021 | Cummins | H04W 12/68 |

\* cited by examiner

CONFIGURATION OF HIGH ALTITUDE PLATFORM-BASED CELLULAR RADIO ACCESS NETWORK

TECHNICAL FIELD OF THE DISCLOSURE

The disclosure concerns configuring a cellular radio access network provided by a High Altitude Platform (HAP), such as an airship or a satellite (considered a HAP in this disclosure).

BACKGROUND TO THE DISCLOSURE

Cellular wireless communication networks provide wide geographical coverage by allowing mobile terminals to access the network through a Radio Access Network (RAN) formed of cells, each cell having a specific geographical coverage area. In this context, a cell refers to a base station (RAN access node) having a cell identifier (Cell ID), for example as used in Third Generation Partnership Project (3GPP) standards. Coverage areas of cells may overlap and this may assist to avoid areas without coverage. Virtualization of cells may allow more flexible and lower cost deployment of cells. Nevertheless, there are still certain areas without cellular wireless network coverage, for example where the deployment of cells is hazardous, difficult, costly or a combination of these. This may particularly occur in rural areas and developing countries.

The use of a High Altitude Platform (HAP) to provide cells, in particular using 4G or 5G, allows coverage on the ground as it would be by a typical Mobile Network Operator (MNO) site, allowing access by the same mobile terminals supporting this RAN in the terrestrial networks. In the context of the present disclosure, a satellite will be considered a type of HAP and this term includes any type of radio platform, typically operating above 20 km in altitude and preferably at a specified, nominal, fixed point relative to the Earth. The term HAP as used herein should not be confused with the term "High Altitude Platform Station" used in the International Telecommunication Union (ITU) Radio Regulations, which has a narrower definition than the term HAP of this disclosure. A RAN provided by a HAP infrastructure involves complexities.

Figure 1:
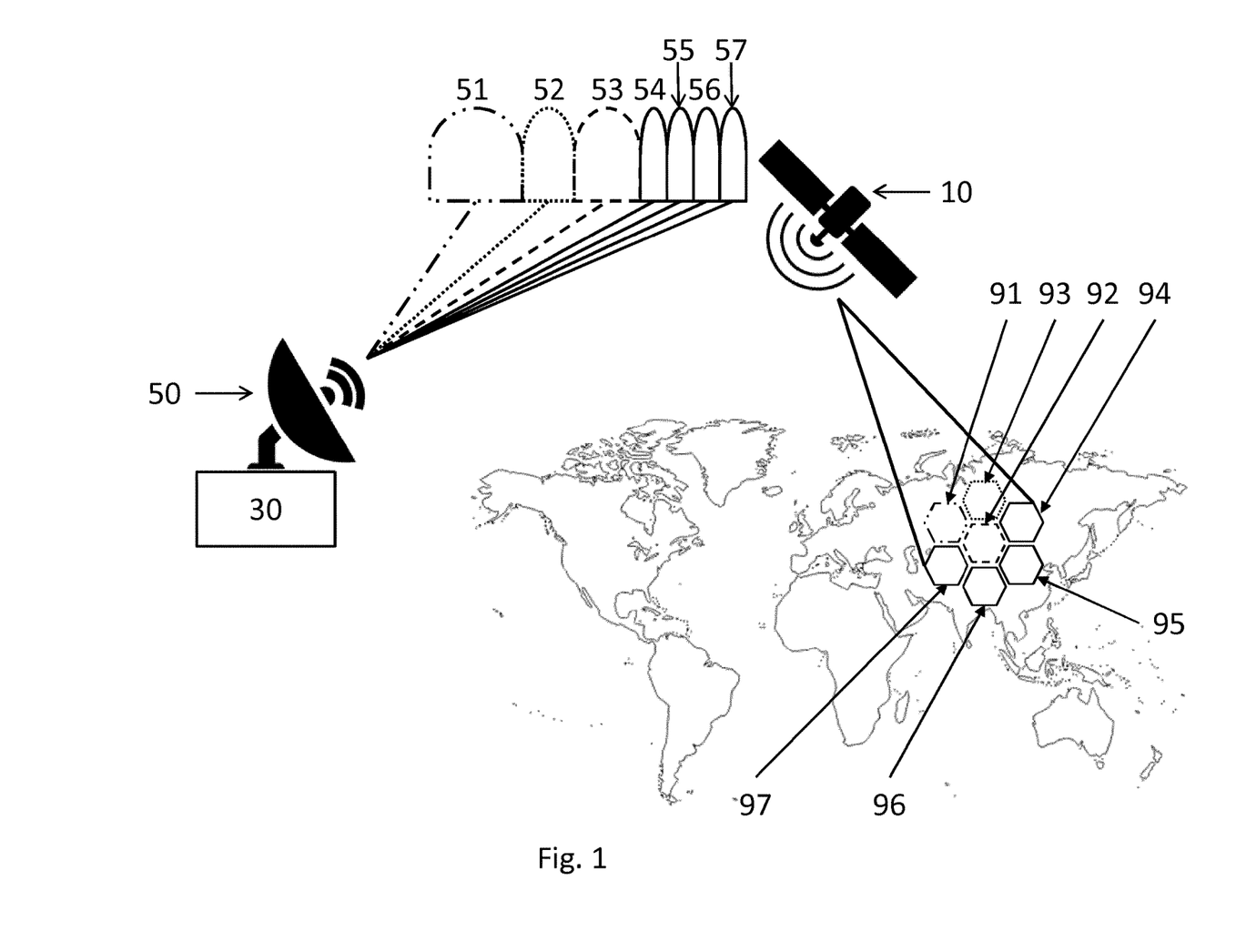
FIG. 1 shows a schematic architecture for an exemplary cellular RAN provided through a HAP.

Referring first to FIG. 1, there is shown a schematic architecture for an exemplary cellular RAN provided through a HAP, for example a satellite 10. The HAP 10 acts as a repeater between a baseband system 30 and the end users (for example, any SIM-based devices including mobile terminals, not shown). The baseband system 30 generates radio signals for transmission by the HAP 10 and also processes baseband signals received by the HAP 10. Thus, the baseband system 30 provides lower level base station functions (and may be virtualized or non-virtualized). In this case, seven separate intermediate signals are shown (the use of similar dotting or dashing of lines as in other parts of the drawings indicates correspondence). Each intermediate signal represents a baseband carrier signal for a respective cell, each carrier signal having a respective bandwidth. These are provided to a HAP gateway antenna unit 50, which acts as a mixer, multiplexer and ground station radio. The transmission frequency between the gateway antenna unit 50 and the HAP 10 is typically in the Ku-band or Q-band, especially when the HAP 10 is a satellite. The communication between the baseband system 30 and the HAP 10 is thereby made through the antenna 50. The seven intermediate signals (in this case for LTE signals using Orthogonal Frequency Division Multiplexed, OFDM, signals) are transmitted to the HAP 10 multiplexed in frequency, by first intermediate signal 51, second intermediate signal 52, third intermediate signal 53, fourth intermediate signal 54, fifth intermediate signal 55, sixth intermediate signal 56 and seventh intermediate signal 57. The intermediate signals each represent a respective carrier signal. The bandwidth for each signal is different and it is depicted by the width in FIG. 1.

The HAP 10 transmits the seven radio signals using individual, respective beams. The first carrier 51 is transmitted using a first beam to provide a first coverage area 91 (the upper left area shown), the second carrier 52 is transmitted using a second beam to provide a second coverage area 92 (the central area shown), the third carrier 53 is transmitted using a third beam to provide a third coverage area 93 (the top area shown), the fourth carrier 54 is transmitted using a fourth beam to provide a fourth coverage area 94 (the upper right area shown), the fifth carrier 55 is transmitted using a fifth beam to provide a fifth coverage area 95 (the lower right area shown), the sixth carrier 56 is transmitted using a sixth beam to provide a sixth coverage area 96 (the lower central area shown) and the seventh carrier 57 is transmitted using a seventh beam to provide a seventh coverage area 97 (the lower left area). Communication between the HAP 10 and the end users is in the standardized 3GPP radio access bands. Each carrier signal is transmitted within a respective allocated frequency channel.

The HAP 10 is thereby capable of managing a large number of wireless network cells and they can be communicated (that is, transmitted and/or received) over specific areas through directive beams. However, the HAP is limited in both power and bandwidth. The bandwidth limitation especially applies for the link between the HAP 10 and the antenna unit 50. The baseband dimensioning is directly linked to the number of cells to be processed. As a result, the total bandwidth available for transmission (and/or reception) by the HAP in providing the RAN is limited. The same issues may apply whatever form of HAP are used.

In any event, traffic demand can be quite uneven. Not only can this demand sharply change over a short period of time (a number of hours, a day and/or a week), but also HAP coverage may target areas having low population density, so that many cells can be inactive (without traffic demand) for a higher proportion of the time.

Standards set by the Third Generation Partnership Project (3GPP) require a 4G network to transmit a Cell-specific Reference Signal (CRS) over the whole carrier bandwidth, even if the cell is inactive. The channel bandwidth for a cell defined in the existing 3GPP Standards are 1.4, 3, 5, 10, 15 and 20 MHz. The channel bandwidths allowed depend on the operating band (for instance, see http://niviuk.freeir/lte_bandwidth.php). For inactive cells, the optimum is to use the minimum carrier bandwidth, that for example for Band 8 (900 MHz GSM) is 1.4 MHz, so each cell would require this amount of the HAP bandwidth, even without any activity. Thus, the HAP 10 broadcasts seven beams to define seven cells, although four of these (using the fourth carrier 54, fifth carrier 55, sixth carrier 56 and seventh carrier 57) have the minimum carrier bandwidth and are probably empty. That means using 1.4×4=4.6 MHz of HAP bandwidth to signal an empty region. In addition, each cell would consume some baseband resources and the required power to guarantee the desired coverage level. Improving the efficiency of the cellular network provided by the HAP is therefore desirable.

SUMMARY OF THE DISCLOSURE

Against this background, the present disclosure provides a method for configuring a cellular radio access network provided by a high altitude platform (HAP), such as a satellite or airship, according to claim 1, a computer program according to claim 14 and a configuration system in line with claim 15. Other preferred features are disclosed with reference to the claims and in the description below.

Adjusting the resource allocation, in particular, the configuration of each cell in terms of its association with one or more HAP beam, its carrier bandwidth and/or carrier power, in response to cell and/or beam load (for example, in terms of traffic and/or user) can improve the efficiency of the resource management. The resource allocation can be effected by setting a configuration of the HAP transmission. This approach can be implemented to allow dynamic adaptation of resources to traffic in real time, for instance so that the power for the HAP and bandwidth for the HAP (and/or the association between cells and beams) are optimised to maximise performance without wasting baseband requirements. The approach of the disclosure may be implemented as a computer program and/or as a configuration system.

In preferred embodiments, the HAP signal (for transmission by the HAP or received by the HAP) is communicated between a baseband system (for example at a ground station) and the HAP. The HAP repeats a received HAP signal from the baseband system as a downlink (transmitted by the HAP) and/or sends the HAP signal to the baseband system in the uplink (received by the HAP). The HAP signal may therefore be communicated in either direction (or indeed both directions). This approach may be especially beneficial for 4G (or other OFDM-based) radio access networks.

Configuration data is advantageously communicated (communication in the context of the present disclosure including transmitting and/or receiving) from the baseband system to the HAP. The configuration data indicates the configuration set, in particular as a table or look-up table.

The configuration may be set (and/or adjusted) in a number of ways. For example, the number of cells can be increased or reduced and/or the association between cells and beams can be changed. A current cell associated with two or more beams could be replaced with two cells, each associated with at least one of the beams of the current cell, thereby splitting the current cell into two (or more) new cells. This may be performed in response to an increase in load, for example in respect of traffic and/or number of users. The total number of cells communicated via the HAP may have a predefined maximum number. Additionally or alternatively, two or more current cells, each associated at least one beam may be merged into a new cell associated with some or all of the beams associated with the current cells. This may be performed in response to a decrease in load. The bandwidth and/or power of the new cell or cells may be set based on the load.

In another example (which may be combinable with other example disclosed herein), the bandwidth and/or power of any current cells may be set based on load. For instance, the bandwidth and/or power of a cell may be increased based on load increasing or being high, provided that a predetermined maximum level is not exceeded. Conversely, the bandwidth and/or power of a cell may be decreased based on load decreasing or being low. In embodiments, this may be a first response to load changes before other steps are taken.

Cells (and the mapping to beams of those cells) for any configuration change (splitting, margining and/or resource adjustment) may be identified based on their carrying a load above or below a threshold level (different levels being possible for high and low load cases) and/or carrying a load having a rate of increase above or below a threshold level (again, different levels being possible for increasing and decreasing load cases).

The load used for setting the configuration may be based on actual and/or predicted load. In addition, the load used for setting the configuration may be based on a cell load and/or a beam load. The cell load may be based on one or more of: a number of user (mobile) terminals accessing the respective cell; a cell load ratio, for example as a percentage of Physical Resource Blocks (PRBs) used; total uplink and/or downlink throughput for the respective cell; and types of user terminals accessing the respective cell (for instance, whether the user terminals are smartphones, machine-type communication devices and other capabilities). A beam load may be based, for example on a signal level received at the HAP for the beam and/or a number of users (user terminals) with a connection using the beam.

BRIEF DESCRIPTION OF THE DRAWINGS

The approach of the disclosure may be put into practice in various ways, one of which will now be described by way of example only and with reference to the accompanying drawings in which.

DETAILED DESCRIPTION OF ONE OR MORE PREFERRED EMBODIMENTS

The arrangement shown in FIG. 1 represents a static cell management, in which each cell is associated to a respective individual beam, so that the beam coverage for each cell is fixed and given by the beam fingerprint. This is explained further with reference to a particular example, concerning a HAP that manages a large number of beams (this may number hundreds or thousands, for example up to 5000 beams). Each beam covers a specific area, for instance being tens of kilometres in diameter. Small overlapping between beams is possible. Whilst the examples herein focus on a HAP-provided RAN, any other form of High Altitude Platform (HAP) may be used, such as an airship, aeroplane, balloon or similar. As noted above, signalling (in particular the physical broadcast channel, PBCH, the primary synchronization signal, PSS, the secondary synchronization signal, SSS, and/or CRS) must be sent in all beams, even without traffic. This is providing in order to assure service of any user that tries to access the network at any time. Options for carrier bandwidth in 4G are 1.4, 3, 5, 10 and 20 MHz.

The link between the baseband system (which might be at or connected to a ground station, for instance when a satellite is used) and the HAP, has a limited number of cells that can be managed. For example, the maximum HAP link bandwidth is 14 GHz and the maximum HAP power is 10 kW and, as explained before, the minimum bandwidth per cell is 1.4 MHz (even if empty) for signalling. In a static cell management case, where each cell is allocated a single respective beam out of 5000 beams, if 2% of the cells are empty (that is 100 cells), at least 100×1.4=140 MHz would be wasted for signalling. Alternatively, the maximum number of 10 MHz cells for static cell management would be given by solving 1.4·(5000−x)+10·x=14000 for x, so that only 813 cells of 10 MHz bandwidth are possible. Potentially, 14000-813×10=5870 MHz would be wasted for signalling or very low traffic.

Figure 2:
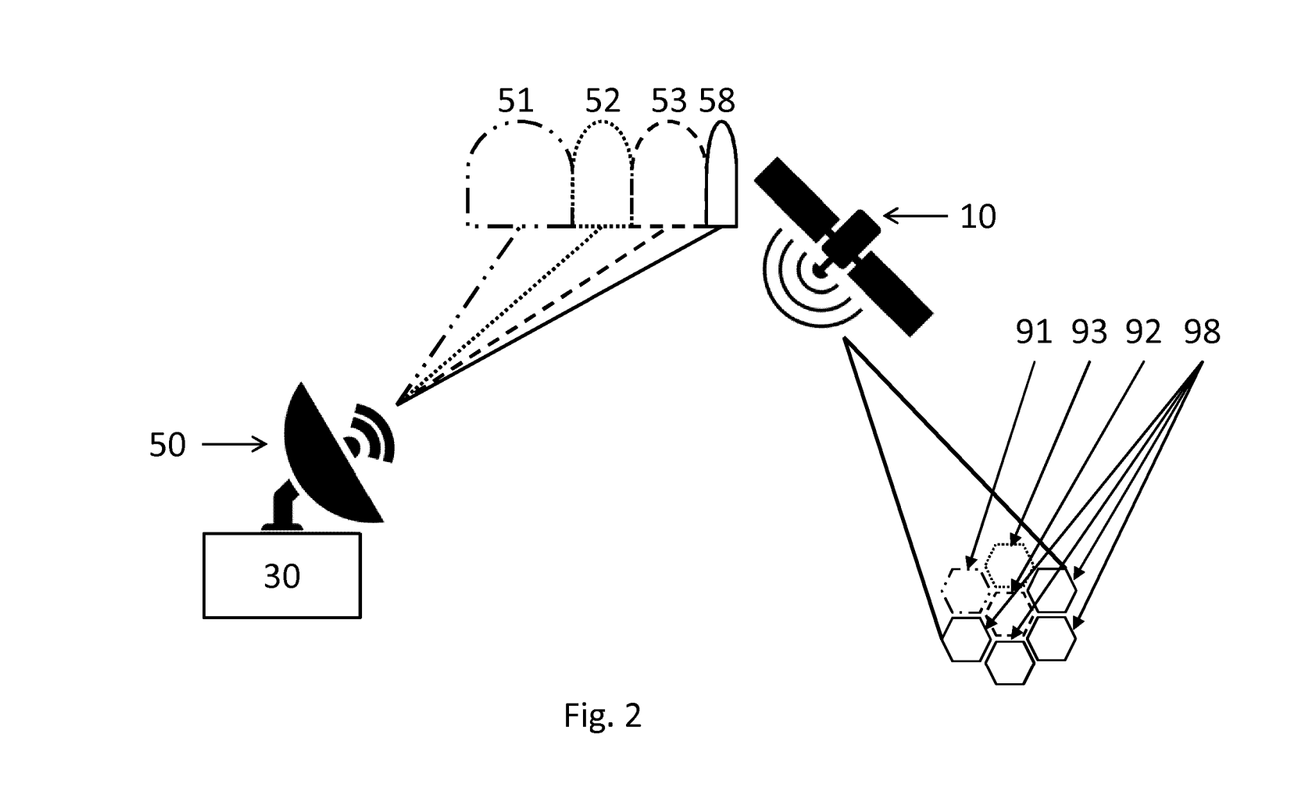
FIG. 2 shows a portion of the schematic architecture of FIG. 1, with an alternative cell management approach in accordance with the disclosure.

Referring to FIG. 2, there is shown a portion of the schematic architecture of FIG. 1, with an alternative cell management approach. Where the same features are shown as depicted in FIG. 1, the same reference numerals are employed.

In the approach of FIG. 2, a modified fourth carrier 58 is used to provide a single cell having a single multi-beam coverage area 98, corresponding with the fourth coverage area 94, fifth coverage area 95, sixth coverage area 96 and seventh coverage area 97 of FIG. 1. This only requires 1.4 MHz of HAP bandwidth. This represents a dynamic cell management approach, which may allow significant efficiency benefits in bandwidth and other resource utilization compared with a static cell management that could result in wasting both HAP and baseband resources.

In addition, cells with higher demand, such as the cells provided by the first carrier 51, second carrier 52 and third carrier 53 in FIG. 2, should be allocated with higher bandwidth, while inactive cells should not consume more than the minimum bandwidth. Additionally (or alternatively), the transmission power for the cell downlink should be adjusted accordingly in order to optimize the HAP power.

In general terms, there may therefore be considered a method for configuring a cellular Radio Access Network (RAN) provided by a HAP, such as a HAP or airship. The HAP has an antenna system defining a plurality of beams (for example, of a fixed maximum number), such that the beams provide separate geographical coverage areas (on the Earth, optionally with the geographical coverage of each beam being fixed). The RAN comprises a plurality of cells, each cell being associated with at least one of the plurality of beams (that is, for the cell to provide communication to one or more user terminals using the associated beam or beams in the respective coverage area or areas). For each of the plurality of cells and/or each of the plurality of beams, a respective load (for instance, a traffic load and/or a number of users attached to or serviced by the cell, specific to the cell and/or beam) is identified. A configuration is set, based on the cell loads for the plurality of cells. This configuration is advantageously for one or more of: a total number of the plurality of cells (for instance, increasing or decreasing the total number of cells); the associations between the plurality of cells and the plurality of beams; and a bandwidth and/or a power (and/or baseband processing resource) for each of the plurality of cells. In other words, the configuration represents the resources allocated to the HAP-provided cells, including the beams, carrier or transmission bandwidth and transmission power. The configuration may also represent the total number of cells being provided.

This solution provides an efficient resource management that can be dynamically adapted to traffic or cell conditions in real time, in particular so that the HAP power and bandwidth are optimised to maximise performance without wasting baseband requirements. The method may be implemented in the form of a computer program (for example, configured to perform the method when executed by a processor, such as having instructions accordingly), a computer program product (for instance on a non-transitory computer-readable medium) comprising the computer program. Additionally or alternatively, it may be implemented using logic circuitry (including digital logic), programmable memory or circuits, reprogrammable logic (for instance, FPGA devices) or equivalent arrangements. In a further example, the method may be implemented using a configuration system, arranged to interface with a HAP and thereby configure a cellular radio access network provided by the HAP accordingly. This may be part of a ground station (or baseband system) and/or a HAP, for instance within or coupled to a baseband part or other part of the RAN or core network infrastructure.

The configuration may be set in accordance with an algorithm, which may be an optimization algorithm in some embodiments. For instance, the step of setting a configuration may comprise jointly optimising two or more of: (i) a total number of the plurality of cells; (ii) the associations between the plurality of cells and the plurality of beams; and (iii) one or more of: a link bandwidth; baseband processing resources; and a power for each of the plurality of cells, based on the loads for the plurality of cells and/or the plurality of beams.

Optionally, a (baseband) "repeater" signal is communicated (as noted above, this may comprise transmitting and/or receiving) between a ground station and the HAP. In particular, the "repeater" signal may comprise an uplink and/or downlink signal for the cellular radio access network in accordance with the set configuration. Thus, the "repeater" signal may thereby define a signal received and/or transmitted by the HAP to affect the cellular radio access network. The HAP signal may define one or more OFDM signals, for instance in accordance with 4G or 5G (NR). The ability to change the bandwidth, power spectral density and other resource allocation of OFDM signals makes it well-suited to such an approach.

Further features in accordance with this generalized description will be detailed below. A more specific implementation will first be discussed, as an example.

Figure 3:
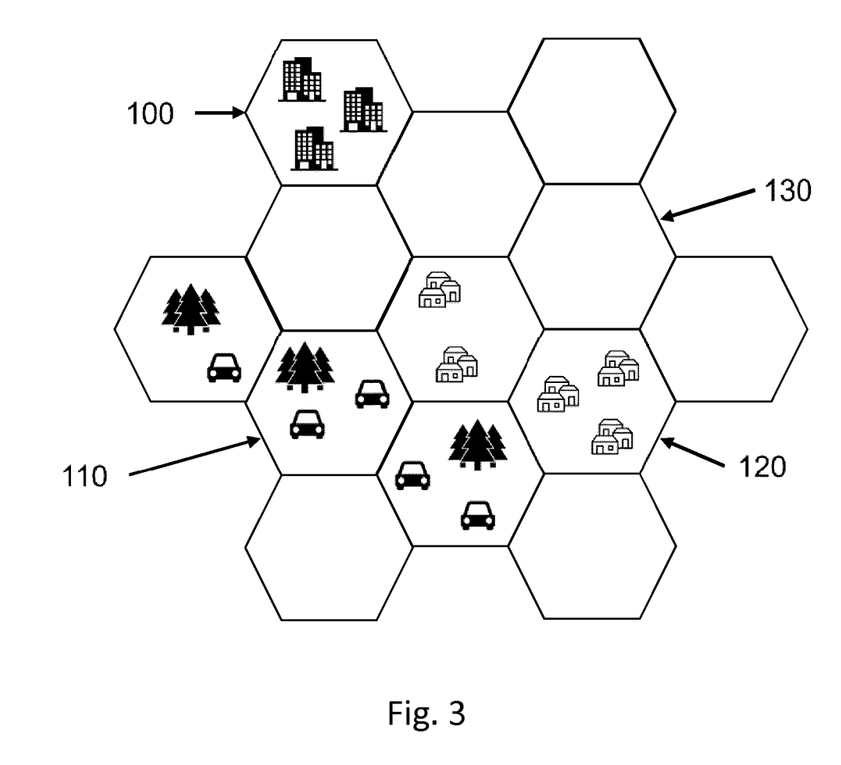
FIG. 3 schematically illustrates a multi-cell arrangement, showing different loading in cells.

Referring to FIG. 3, there is schematically illustrated a multi-cell arrangement, showing different loading in cells and beams. Each hexagon in this drawing corresponds with a single beam of the HAP. There is shown: an urban area 100; an area through which a road passes 110; a rural area 120; and empty areas 130. As noted above, allocating each beam to a different cell would be straightforward to realize, but would result in a waste of bandwidth, especially in the empty areas 130, which comprises more than 50% of the number of beams shown. The road area 110 would likely require a high frequency of handover.

In a dynamic cell management case, where each cell uses one or more beams to adapt to traffic needs, several beams may be assigned to the same 1.4 MHz cell (or the minimum bandwidth allowed in the used band) in coverage areas with low or zero throughput, for example empty areas 130, to reduce the bandwidth of the link between the baseband system 30 and the HAP 10 that is wasted on signalling. In that case, the maximum number of 10 MHz cells would be given by solving for x in the expression 1.4+10·x=14000, meaning that 1399 cells of 10 MHz bandwidth would be possible and only cell of 1.4 MHz would be required for signalling, so as to provide 1400 cells in total. This allows non-dense areas to share to a single cell. The bandwidth of each cell can also be adapted to traffic demand, so that both bandwidth and power are optimized. For instance, rural areas 120 can be provided with a single cell covering two beams. High mobility areas, such as the road 110, may be provided with a single cell covering the three beams, which can avoid the need for frequent handovers. The urban area 100 can have a single cell with just one beam.

A new cell can be created in one or more given beams if the beam load demands it and any cell can be deleted and those beams absorbed by another existing cell, if the beam load decreases in that area. The issue can be seen as a clusterization problem, for the distribution of 5000 beams among up to 1400 cells.

However, signalling becomes more complex in this embodiment, as the relationship between cells and beams can change dynamically (or at least semi-statically). Also, if a cell uses more than one beam, the HAP needs to be informed as to in which beam the user is located.

Figure 4:
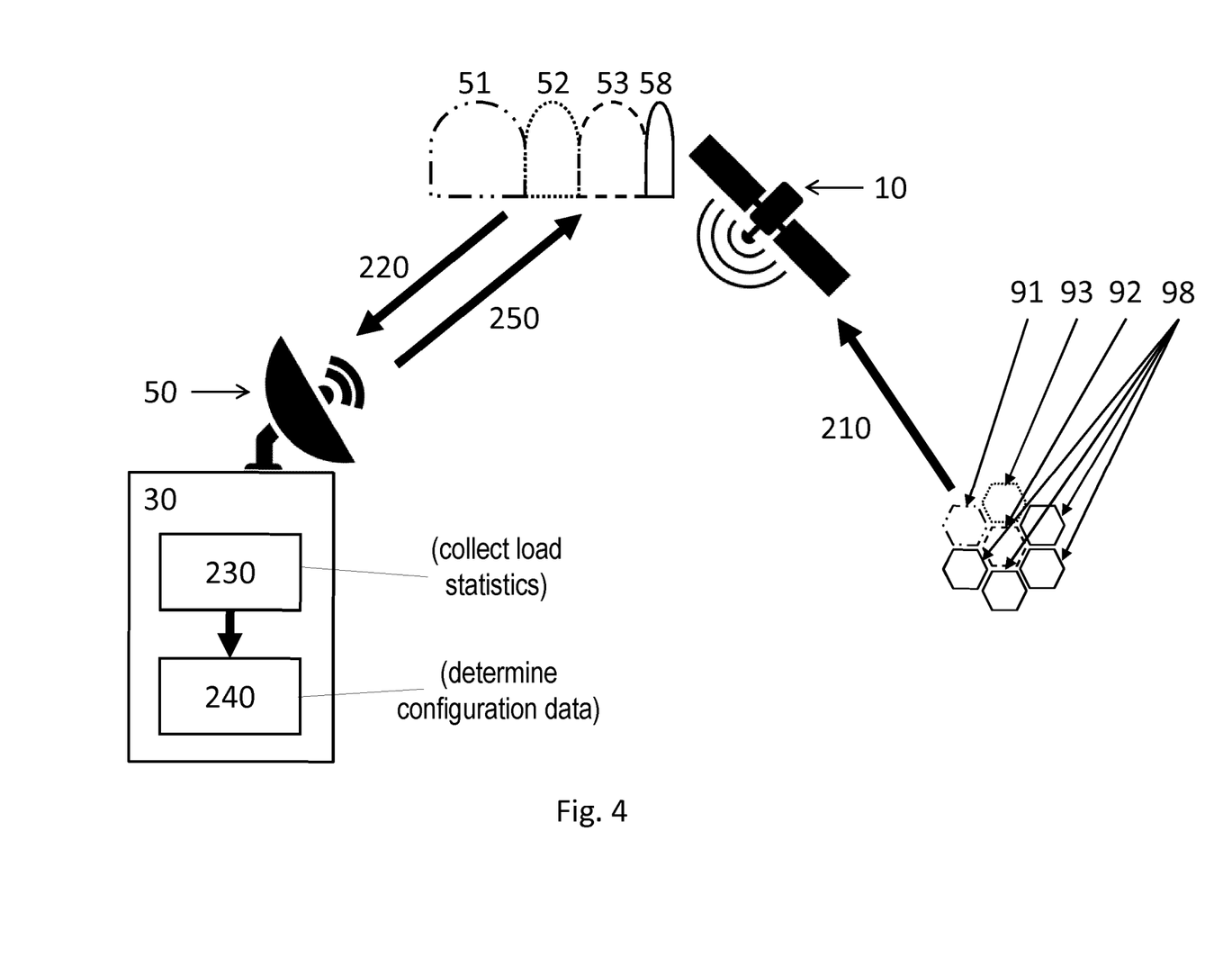
FIG. 4 depicts the schematic architecture of FIG. 1, showing a signalling exchange in accordance with an embodiment of the disclosure.

Referring to FIG. 4, there is depicted the schematic architecture of FIG. 1, showing an exemplary signalling exchange. In step 210, the HAP 10 receives signals from mobile terminals on the ground and in the coverage areas provided by the beams of the HAP 10. This allows measurements of received power for the uplink transmissions from the mobile terminals at the HAP 10. The HAP 10 provides the received uplink signals for each beam to the baseband system 30 in step 220. As a result, for each beam (having a respective identifier or BeamID), activity of new users can be detected at the baseband system 30. In some embodiments, the users detected per beam can be signalled from the HAP 10 to the baseband system 30.

In step 230, the baseband system 30 (or an associated system) collects load statistics for each cell. This can be achieved by the use of counters. It allows the baseband system 30 to build up a look-up table, with the information acquired from the signals received in the uplink. The baseband system 30 (or associated system) can then use an algorithm to determine configuration data, including the appropriate number of cells, mapping between beams and cells, bandwidth for each cell and power for each cell in step 240. This information is also added to the look-up table. The configuration data (preferably in the form of the lookup table) is communicated to the HAP 10 in step 250. The HAP 10 is also provided with the downlink transmission signals, configured correspondingly. The HAP 10 then transmits the downlink transmission signals of the different cells mapped on the beams, as set by the configuration data. It should also be noted that a control channel between the HAP 10 and the baseband system 30 may be used for signaling, but this is not shown.

An example lookup table in accordance with the embodiment described above is shown below. This also indicates whether the information is an input to the cell configuration algorithm or an output of this algorithm. In this example, three cells are defined over six beams. The first cell (CellID 1) uses three beams. This cell is moderately loaded, with between 2 and 8 users per beam. Therefore, a medium cell bandwidth (5 MHz) and medium cell transmission power (42 dBm) are set. This may correspond with a rural area, as shown in FIG. 3. The second cell (CellID 2) uses only one HAP beam. The cell is heavily loaded with 20 users. Therefore, a high cell bandwidth (10 MHz) and high cell transmission power (45 dBm) are set. In terms of FIG. 3, this may correspond with an urban area. The third cell (CellID 3) uses two beams, but has no users. Consequently, the minimum cell bandwidth (1.4 MHz) and minimum cell transmission power (36 dBm) are set.

| Scenario Example | CellID (output) | BeamID (output) | Beam Load (Number of Users) (input) | Cell load (input) | Cell Bandwidth (output) | Cell Power (output) |
|---|---|---|---|---|---|---|
| Rural | 1 | 1 | 5 | 50% | 5 MHz | 42 dBm |
|  |  | 2 | 2 |  |  |  |
|  |  | 3 | 8 |  |  |  |
| Urban | 2 | 4 | 20 | 80% | 10 MHz | 45 dBm |
| Rural (no users) | 3 | 5 | 0 | 10% | 1.4 MHz | 36 dBm |
|  |  | 6 | 0 |  |  |  |

Figure 5:
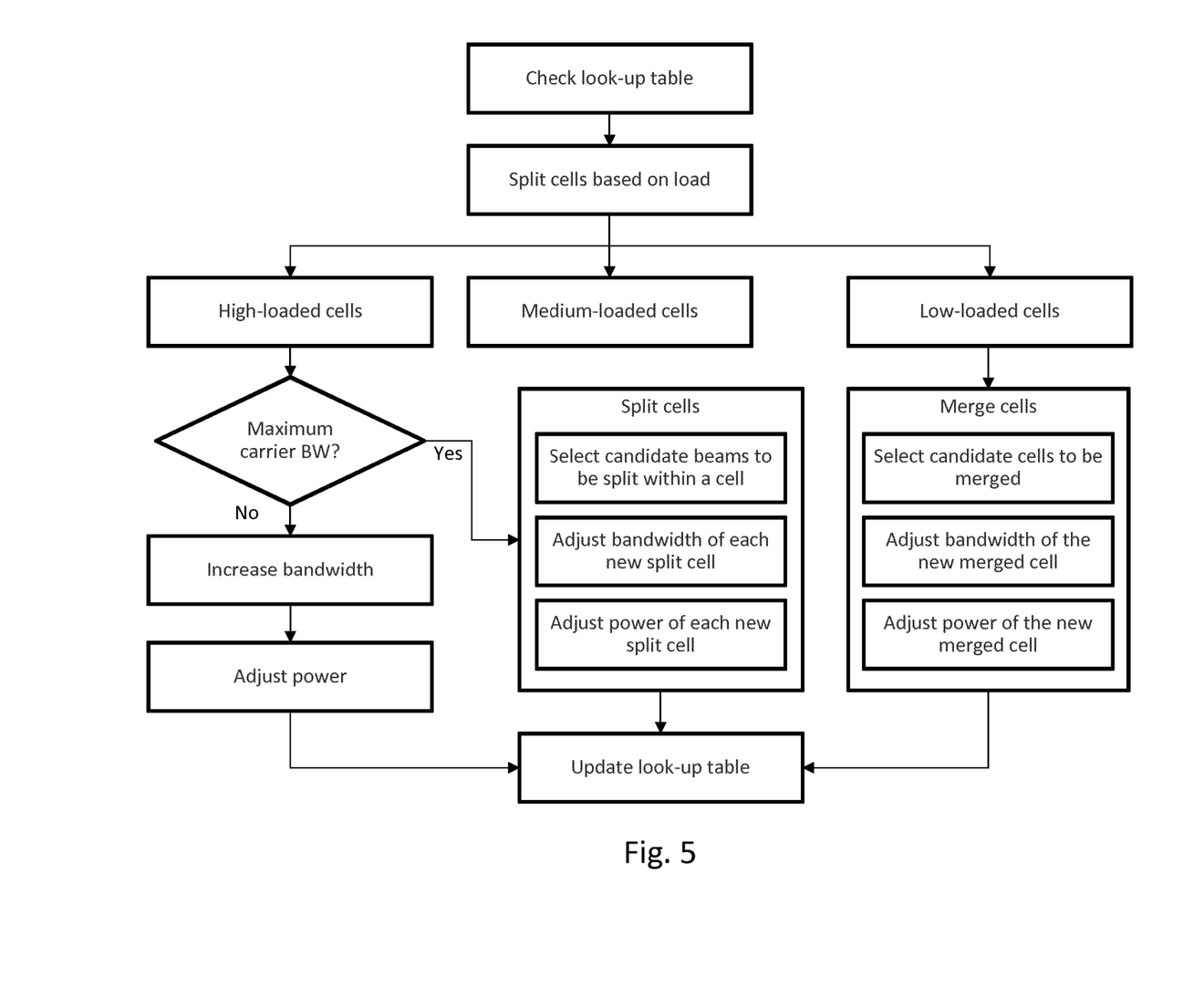
FIG. 5 illustrates a flow chart in line with an embodiment of the disclosure.

An algorithm to configure the cells based on the load information is therefore provided. A range of algorithms are possible and in general, this may be considered an optimization problem with constraints in respect of minimum and maximum bandwidths and powers per cell. Other constraints may also be applied. Referring to FIG. 5, there is illustrated a flow chart showing an example algorithm for this configuration. This defines the relationship between beams and cells dynamically, as well as the optimal bandwidth and power per cell.

The inputs to the algorithm are provided by the lookup table and this allows the cells to be categorized by their current load (and/or a predicted load). Cell load (as collected at the baseband unit 30) can be a key parameter to understand to address the bandwidth limitation. Three categories are used in this algorithm: low-loaded cells; medium-loaded cells and high-loaded cells. Thresholds can be defined in respect of cell load to determine how to categorize the cell.

Low-loaded cells are not efficiently used. Therefore, the algorithm tries to merge the beams mapped to these cells and use just one cell. Candidate cells for merging are identified (for example, because the sum of the loads across the identified cells is less than 100%). The beam load is also considered (for example, cells with zero users per beam over most or all beams may be appropriate candidates). The bandwidth and power of the merged cell is set appropriately based on the predicted load of the merged cell. This potentially allows bandwidth to be saved, which can be used somewhere else. Power is set to maintain a similar (or the same) power density as before the merging.

In contrast, high-loaded cells typically require more bandwidth. If the current cell bandwidth is less than the maximum allowed (for example, 10 MHz), the bandwidth is increased (no higher than the maximum allowed) and the cell transmission power is adjusted accordingly, typically to maintain a similar (or the same) power density. If the current cell bandwidth is at the maximum allowed, the cell is may be suitable for splitting. For example, a cell having the maximum bandwidth, using more than one beam and with users across different beams represents a candidate for splitting. Firstly, the beams to be split between different cells are identified depending on the beam load, for instance beams communicating with more than zero users. The existing single cell can be replaced by more than one cell with the beams divided between the new cells (although in practice, the existing cell may be one of the new cells, simply configured with fewer beams). The bandwidth and power of each of the new cells (which may include the pre-existing cell, as appropriate) is then set in accordance with the predicted load for the respective cell. The power adjustments maintain a similar (or the same) power density as before the cell split.

Medium-loaded cells are considered in optimal conditions. Hence, their configuration is not modified, in order to avoid unnecessary network changes. After all the configurations are made, the lookup table is updated accordingly.

In accordance with the general terms discussed previously, it may be understood that the step of setting a configuration could comprise communicating configuration data (for instance in the form of a table or a lookup table) from a baseband system (for example at a ground station) to the HAP, the configuration data indicating the set configuration.

There are a number of options for setting a configuration for the total number of the plurality of cells and the associations between the plurality of cells and the plurality of beams. These options are not mutually exclusive, as the different options may be performed for different cells or groups of cells. One option (cell splitting) comprises replacing a current cell associated with first and second beams of the plurality of beams, with a first substitute (new or existing) cell associated with the first beam and a second substitute (new or existing) cell associated with the second beam. The first or second substitute cell may therefore be the current cell. This may alternatively be expressed as replacing one cell associated with a subset of beams comprising at least two of the plurality of beams with two cells, each of the two cells being associated with at least one beam of the subset of beams. In either expression, such replacement of one cell by multiple cells (using the same beams) may be performed in response to an increase or high in the traffic load for the current cell or beam and/or another cell or beam, as will be discussed below.

In such cases, setting a configuration for the bandwidth and/or power for each of the plurality of cells may comprise setting a configuration for the bandwidth and/or power of the first substitute cell and/or second substitute cell based on the cell loads for the plurality of cells. In this respect, setting a configuration for the power of the first substitute cell and/or second substitute cell may comprise setting a configuration for the power of each beam associated with the first substitute cell and/or second substitute cell. Additionally or alternatively, setting a configuration for the bandwidth of the first substitute cell and/or second substitute cell may comprise setting a configuration for the bandwidth of all beams of the first substitute cell and/or all beams of the second substitute cell (as bandwidth is a characteristic of each cell, rather than each beam). In embodiments, setting a configuration for the total number of the plurality of cells may comprise identifying the current cell and/or the first and second beams as carrying a load above a high load threshold level and/or as carrying a load having a rate of increase above an increase threshold level. In other words, this may identify high-loaded cells and/or beams.

Preferably, increasing the total number of cells, for example by replacing a current cell associated with first and second beams of the plurality of beams, with a first substitute cell associated with the first beam and a second substitute cell associated with the second beam (that is, cell splitting), is dependent upon one or more factors. For example, the factors may include that the total number of the plurality of cells is less than a predetermined maximum number of cells. In other words, cell splitting is not performed so as to increase the total number of the plurality of cells to more than a predetermined maximum number of cells (although it is possible for the total number of the plurality of cells to equal the predetermined maximum number of cells). Another factor that may be considered is that a total bandwidth used by the plurality of cells (that is the sum of the bandwidths of each cell) is less than a predetermined maximum bandwidth (which may be defined by the bandwidth of a link between the baseband system and the HAP). A further factor may be that the current cell bandwidth is at a predetermined bandwidth.

In another option (cell merging), a first existing cell associated with one beam of the plurality of beams and a second existing cell associated with another beam of the plurality of beams are replaced with a replacement cell associated with the one beam and the other beam. This may alternatively be expressed as replacing a first cell associated with at least one first beam of the plurality of beams and a second cell associated with at least one second beam of the plurality of beams, with a new cell associated with the first and second beams. In either expression, such replacement of multiple cells by a single cell (using the same beams) may be performed in response to a decrease in the load for one or more of the: first existing cell; the second existing cell; and another cell, as will be discussed below. Additionally or alternatively, this approach may be used to maintain a cell for a beam or set of beams, and transmit the same cell for a new beam or set of beams, thereby extending the geographical coverage area for the cell.

In such cases, setting a configuration for the bandwidth and/or power for each of the plurality of cells may comprise setting a configuration for the bandwidth and/or power of the replacement cell based on the cell loads for the plurality of cells. In embodiments, setting a configuration for the total number of the plurality of cells may comprise identifying the first and second existing cells and/or the one and another beam as carrying a load below a low load threshold level and/or as carrying a load having a rate of decrease above a decrease threshold level. In other words, this may identify low-loaded cells.

A further option comprises setting a configuration for the bandwidth for each of the plurality of cells. The bandwidth for a cell may be increased, particularly if the bandwidth for the cell is less than a predefined maximum bandwidth, for example in response to a high load or increased load for the cell and/or another cell. Additionally or alternatively, the bandwidth for a cell may be decreased, for example in response to a low load or a decrease in the load for the cell and/or another cell. Such changes in the bandwidth of one or more cells may be carried out before splitting cells, as discussed above.

Yet another option comprises setting a configuration for the power for each of the plurality of cells and/or beams. This may especially be done after changes in bandwidth for a cell. The power for a cell or beam may be increased, for example if the total power for all of the plurality of cells is less than a predefined maximum power. This may be done in response to a high load or an increase in the load for the cell and/or another cell. It may be done when the cell bandwidth is increased, to keep the power spectral density the same or similar (within a predetermined tolerance). The power for a cell or beam may be decreased. In one approach, this may be in response to a low load or a decrease in the load for the cell or beam and/or another cell or beam. It may be done when the cell bandwidth is decreased, to keep the power spectral density the same or similar (within a predetermined tolerance).

Identifying, for each of the plurality of cells and/or each of the plurality of beams, a respective load may comprise one or both of: determining a current load for one or more of the plurality of cells and/or for one or more of the plurality of beams (especially for determining whether to split and/or merge cells); and predicting a future load for one or more of the plurality of cells (particularly for setting bandwidth and/or power for the cell). Predictions may be based on previous and current load, time, day, load in cells having adjacent coverage areas and other parameters. For example, identifying, for each of the plurality of cells, a respective load may be based on one or more of: a number of mobile terminals accessing the respective cell; a cell load ratio, for example as a percentage of PRBs used; total uplink and/or downlink throughput for the respective cell; and types of mobile terminals accessing the respective cell. A beam load may be based on a signal level received at the HAP for the beam and/or a number of users with a connection using the beam.

Figure 6:
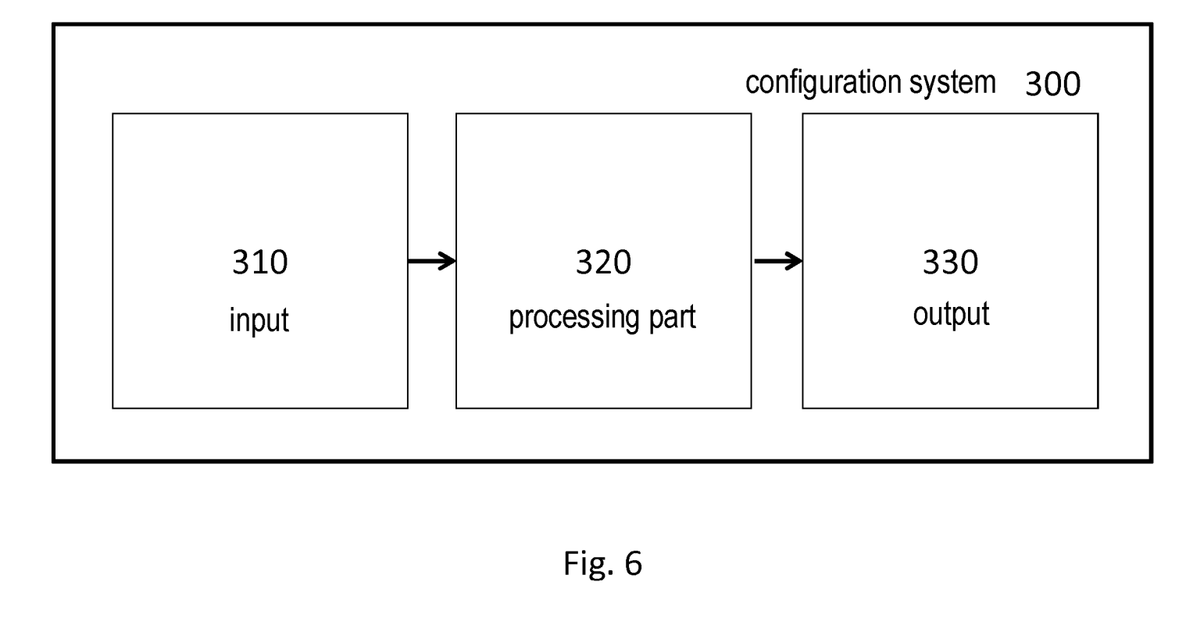
FIG. 6 shows a schematic block diagram of a configuration system in accordance with the disclosure.

Referring now to FIG. 6, there is shown a schematic block diagram of a configuration system 300. As noted above, a configuration system may form part of an existing part of the RAN, for example the baseband system, or it may be a separate unit or server that is typically coupled to the RAN (for instance, baseband system). The configuration system 300 comprises: an input 310; a processing part 320; and an output 330. The configuration system 300 may be embodied by a computer (server) with appropriate interfaces, for instance as discussed below.

The input 310 may comprise an interface to another part of the RAN, for example the baseband system. The input 310 may be configured to receive for each of the plurality of cells and/or each of the plurality of beams, information regarding a respective load. This may be the load or information that can be used to determine the load. The processing part 320 (for instance, a processor or group of processors) is then configured to determine a configuration, based on the loads for the plurality of cells and/or the loads for the plurality of beams, for one or more of: a total number of the plurality of cells; the associations between the plurality of cells and the plurality of beams; and a bandwidth and/or a power for each of the plurality of cells. The output 330 then communicates this configuration to the HAP, for example through the baseband system or other communication link. The input 310 and output 330 may be separate interfaces, or they may be provided by a joint input/output interface to the configuration system 300.

Although a specific embodiment has now been described, the skilled person will understand that various modifications and variations are possible. Also, combinations of any specific features shown with reference to one embodiment or with reference to multiple embodiments are also provided, even if that combination has not been explicitly detailed herein.

It will be noted that a specific algorithm for configure cells based on the (traffic) load information is discussed, but other algorithms are possible. These may use load information in a similar way to that described above or in a different way. The cell configuration may be adjusted based on one or more of: the load for the cell; the load for cells having adjacent coverage areas; and the load of the individual beams (and the loads may be actual and/or predicted).

Although a lookup table is described herein, alternatives can be considered, such as information elements, configuration signals or other types of signalling. Other designs and arrangements of a configuration system are also possible.

The specific architecture of FIG. 1 is only an example and alternative architectures are possible. For instance, the baseband may be implemented differently to that discussed and other interfaces may be employed. The approach described herein is not only applicable to 4G and 5G; other Radio Access Technologies may be used.

RELATED APPLICATIONS

The present application claims priority to European Patent Application No. 19382715.1, filed Aug. 19, 2019, the disclosure of which is hereby incorporated by reference herein in its entirety.

The invention claimed is:

1. A method for configuring a cellular radio access network provided by a high altitude platform (HAP), the HAP having an antenna system defining a plurality of beams, such that the beams provide separate geographical coverage areas, the radio access network comprising a plurality of cells, each cell being associated with at least one of the plurality of beams, the method comprising:
   identifying, for each of the plurality of cells or each of the plurality of beams, a respective load; and
   setting a configuration, based on the loads for the plurality of cells or the loads for the plurality of beams, for both of:
      a total number of the plurality of cells, wherein the total number of the plurality of cells is changeable by merging two or more cells into a single cell or splitting one cell into multiple cells within the plurality of cells, and
      the associations between the plurality of cells and the plurality of beams, wherein each of the separate geographical coverage areas, given by a respective beam fingerprint, are fixed;
   wherein setting a configuration for the total number of the plurality of cells and the associations between the plurality of cells and the plurality of beams comprises:
      replacing a first current cell associated with two or more beams, with a first substitute cell associated with a first subset of the two or more beams and a second substitute cell associated with a second, different subset of the two or more beams, or
      replacing a first existing cell associated with a beam of the plurality of beams and a second or more existing cells associated with another beam or more beams of the plurality of beams, with a replacement cell associated with all the set of beams.

2. The method of claim 1, wherein setting a configuration comprises:
   communicating configuration data from a baseband system to the HAP, the configuration data indicating the set configuration.

3. The method of claim 1, further comprising:
   communicating a HAP signal between a baseband system and the HAP, the HAP signal comprising an uplink or downlink signal for the cellular radio access network in accordance with the set configuration, such that the HAP signal defines a signal received or transmitted by the HAP to effect the cellular radio access network.

4. The method of claim 3, wherein the HAP signal defines one or more Orthogonal Frequency Division Multiplexed (OFDM) signals.

5. The method of claim 1, further comprising setting a configuration for a bandwidth or power for each of the plurality of cells by:
  setting a configuration for a bandwidth or power of the first substitute cell or second substitute cell based on the loads for the plurality of cells or the plurality of beams; or
  setting a configuration for the bandwidth or power of the replacement cell based on the loads for the plurality of cells or the plurality of beams.

6. The method of claim 1, wherein setting a configuration for the total number of the plurality of cells comprises:
  identifying the first current cell or the two or more beams of the plurality of beams as carrying a load above a high load threshold level or as carrying a load having a rate of increase above an increase threshold level; or
  identifying the first and second or more existing cells or the beam and another or more beams as carrying a load below a low load threshold level or as carrying a load having a rate of decrease above a decrease threshold level.

7. The method of claim 1, wherein setting a configuration for the total number of the plurality of cells comprises increasing the total number of the plurality of cells dependent upon a total bandwidth used by the plurality of cells being less than a predetermined maximum bandwidth.

8. The method of claim 1, further comprising setting a configuration for a bandwidth for each of the plurality of cells by:
  increasing the bandwidth for a cell, if the bandwidth for the cell is less than a predefined maximum bandwidth, in response to an increase in the load for the cell or another cell; or
  decreasing the bandwidth for a cell, in response to a decrease in the load for the cell or another cell.

9. The method of claim 1, further comprising setting a configuration for the power for each of the plurality of cells by:
  increasing the power for a cell or beam, if the total power for all of the plurality of cells is less than a predefined maximum power, in response to an increase in the load for the cell or beam or another cell or beam or in response to an increase in bandwidth for the cell; or
  decreasing the power for a cell or beam, in response to a decrease in the load for the cell or beam or another cell or beam or in response to a decrease in bandwidth for the cell.

10. The method of claim 1, wherein setting a configuration comprises jointly optimising two or more of: (i) a total number of the plurality of cells; (ii) the associations between the plurality of cells and the plurality of beams; and (iii) a bandwidth or a power for each of the plurality of cells, based on the loads for the plurality of cells or the plurality of beams.

11. The method of claim 1, wherein identifying, for each of the plurality of cells or each of the plurality of beams, a respective load comprises one or both of:
  determining a current load for one or more of the plurality of cells or one or more of the plurality of beams; and
  predicting a future load for one or more of the plurality of cells or one or more of the plurality of beams.

12. The method of claim 1, wherein:
  the identifying, for each of the plurality of cells, a respective load is based on one or more of: a number of user terminals accessing the respective cell; a cell load ratio; total uplink or downlink throughput for the respective cell; and types of user terminals accessing the respective cell; or
  the identifying, for each of the plurality of beams, a respective load is based on one or more of: a signal level received at the HAP for the beam; and a number of user terminals accessing a cell using the respective beam.

13. The method of claim 1, further comprising setting a configuration for a bandwidth or power for each of the plurality of cells by:
  determining a current bandwidth of the current cell is at a maximum allowed bandwidth level;
  identifying that the first beam is associated with a first set of users and that the second beam is associated with a second set of users;
  replacing the current cell with the first substitute cell associated with the first beam and the second substitute cell associated with the second beam; and
  set the power and bandwidth levels of the first substitute cell and the second substitute cell in accordance with a predicted load for each respective substitute cell.

14. The method of claim 1, wherein the first substitute cell is the current cell with fewer beams.

15. A non-transitory computer-readable medium, having stored thereon computer executable instructions that are configured to cause a computer to perform the method of claim 1 when executed by a processor.

16. A configuration system, arranged to interface with a high altitude platform (HAP) and thereby configure a cellular radio access network provided by the HAP in accordance with the method of claim 1.

* * * * *